United States Patent
Marvit et al.

(10) Patent No.: US 8,332,439 B2
(45) Date of Patent: Dec. 11, 2012

(54) AUTOMATICALLY GENERATING A HIERARCHY OF TERMS

(75) Inventors: David L. Marvit, San Francisco, CA (US); Jawahar Jain, Los Altos, CA (US); Stergios Stergiou, Sunnyvale, CA (US); Alex Gilman, Fremont, CA (US); B. Thomas Adler, Santa Cruz, CA (US)

(73) Assignee: Fujitsu Limited, Kawasaki-shi (JP)

( * ) Notice: Subject to any disclaimer, the term of this patent is extended or adjusted under 35 U.S.C. 154(b) by 887 days.

(21) Appl. No.: 12/242,965

(22) Filed: Oct. 1, 2008

(65) Prior Publication Data

US 2009/0094208 A1     Apr. 9, 2009

Related U.S. Application Data

(60) Provisional application No. 60/977,840, filed on Oct. 5, 2007.

(51) Int. Cl.
*G06F 17/30* (2006.01)
*G06F 7/00* (2006.01)

(52) U.S. Cl. .......... 707/803; 707/788

(58) Field of Classification Search .......... 707/803, 707/778
See application file for complete search history.

(56) References Cited

U.S. PATENT DOCUMENTS

| | | | |
|---|---|---|---|
| 6,587,848 B1 | 7/2003 | Aggarwal et al. | 707/3 |
| 6,651,096 B1 | 11/2003 | Gai et al. | 709/223 |
| 6,847,966 B1 | 1/2005 | Sommer et al. | 707/5 |
| 6,996,572 B1* | 2/2006 | Chakrabarti et al. | 715/205 |
| 7,149,748 B1 | 12/2006 | Stephan | 707/102 |
| 7,231,379 B2 | 6/2007 | Parikh et al. | 1/1 |
| 2002/0174119 A1 | 11/2002 | Kummamuru et al. | 707/6 |
| 2003/0167163 A1 | 9/2003 | Glover et al. | 704/9 |
| 2003/0177112 A1 | 9/2003 | Gardner | 707/3 |
| 2004/0243613 A1* | 12/2004 | Pourheidari | 707/102 |
| 2006/0212294 A1 | 9/2006 | Gorin et al. | 704/245 |
| 2007/0150465 A1 | 6/2007 | Brave et al. | 707/5 |
| 2007/0150466 A1 | 6/2007 | Brave et al. | 707/5 |

FOREIGN PATENT DOCUMENTS

| | | |
|---|---|---|
| WO | WO 2005/091825 A2 | 10/2005 |
| WO | WO 2006/125271 A1 | 11/2006 |

OTHER PUBLICATIONS

Saleem et al., Large Scale Automatic Semantic Integration, 2007, HAL-CCSD, pp. 1-29.*
Saleem et al.: "New Challenges: Large Scale Automatic Semantic Integration", (Hereinafter "Saleem").*
Brace, Karl S., et al., "*Efficient Implementation of a BDD Package*", Proceedings of the 27th ACM/IEEE Design Automation Conference, Paper 3.1, © 1990 IEEE, pp. 40-45, Jun. 24, 1990.
Communication from the European Patent Office, European Search Report for European Patent Application No. 08165760.3-1527, 7 pages, Jan. 26, 2009.

(Continued)

*Primary Examiner* — Kuen Lu
(74) *Attorney, Agent, or Firm* — Baker Botts L.L.P.

(57) ABSTRACT

In certain embodiments, generating a hierarchy of terms includes accessing a corpus comprising terms. The following is performed for one or more terms to yield parent-child relationships: one or more parent terms of a term are identified according to directional affinity; and one or more parent-child relationships are established from the parent terms and each term. A hierarchical graph is automatically generated from the parent-child relationships.

18 Claims, 4 Drawing Sheets

OTHER PUBLICATIONS

U.S. Appl. No. 12/242,950, by inventors David L. Marvit et al., entitled "Automatic Generation of Ontologies Using Word Affinities," 38 pages, filed Oct. 1, 2008.

European Patent Office Communication, European Search Report and Annex to the European Search Report; Application No. 08165783.5-1527/2045734; Ref. P111732EP00/CLH; 5 pages, Jul. 14, 2009.

The State Intellectual Property Office of China, First Notification of Office Action, Patent Application No. 200810165999.X, Chinese Office Action and English translation, 13 pages, May 27, 2010.

The State Intellectual Property Office of China, First Notification of Office Action, Patent Application No. 200810166177.3, Chinese Office Action and English translation, forwarded by foreign associate to Baker Botts on Jan. 14, 2011, 9 pages.

Gonzalo Navarro, Modern Information Retrieval, Chapter 8: *Indexing and Searching*, ACM Press, New York, XP 002457291, ISBN 9780201398298, pp. 191-228, Jan. 1, 1999.

Raymie Stata, et al., "*The Term Vector Database: fast access to indexing terms for Web pages*", Computer Networks 33, Elsevier Science Publishers B.V., pp. 247-254, Jun. 1, 2000.

Wang et al. "Using Term Clustering and Supervised Term Affinity Construction to Boost Text Classification," Springer-Verlag Gerlin Heidelberg, 2005.

European Patent Office, Communication, European Search Report Application No. 10153368.5-2201, Ref. P113501EP00/FWW, 6 pages, Jun. 15, 2010.

\* cited by examiner

|     | $w_1$ DOG | $w_2$ FOREST | $w_3$ TREE | $w_4$ GRAPHICS | $w_5$ COMPUTER |
|---|---|---|---|---|---|
| $w_0$ BINARY | 0.003 | 0.005 | 0.037 | 0.021 | 0.066 |
| $w_1$ DOG |  | 0.024 | 0.033 | 0.017 | 0.049 |
| $w_2$ FOREST |  |  | 0.092 | 0.004 | 0.052 |
| $w_3$ TREE |  |  |  | 0.042 | 0.056 |
| $w_4$ GRAPHICS |  |  |  |  | 0.222 |

*FIG. 3*

|     | $w_0$ BINARY | $w_1$ DOG | $w_2$ FOREST | $w_3$ TREE | $w_4$ GRAPHICS | $w_5$ COMPUTER |
|---|---|---|---|---|---|---|
| $w_0$ BINARY | 1 | 0.004 | 0.005 | 0.016 | 0.020 | 0.037 |
| $w_1$ DOG | 0.018 | 1 | 0.022 | 0.026 | 0.016 | 0.047 |
| $w_2$ FOREST | 0.013 | 0.013 | 1 | 0.055 | 0.008 | 0.026 |
| $w_3$ TREE | 0.071 | 0.029 | 0.102 | 1 | 0.034 | 0.060 |
| $w_4$ GRAPHICS | 0.071 | 0.013 | 0.012 | 0.026 | 1 | 0.255 |
| $w_5$ COMPUTER | 0.360 | 0.112 | 0.103 | 0.128 | 0.716 | 1 |

| | WORD 1 | WORD 2 | WORD 3 | [...] | WORD 50,000 |
|---|---|---|---|---|---|
| WORD 1 | ----- | 0.005 | 0.037 | [...] | 0.066 |
| WORD 2 | | ----- | 0.033 | [...] | 0.049 |
| WORD 3 | | | ----- | [...] | 0.052 |
| [...] | | | | ----- | [...] |
| WORD 50,000 | | | | | ----- |
| AVERAGE | AA1 | AA2 | AA3 | [...] | AA50,000 |

AUTOMATICALLY GENERATING A HIERARCHY OF TERMS

RELATED APPLICATION

This application claims benefit under 35 U.S.C. §119(e) of U.S. Provisional Application Ser. No. 60/977,840, titled "Automatic Generation of a Hierarchy of Terms," filed Oct. 5, 2007, by David Marvit et al.

TECHNICAL FIELD

The present invention relates generally to lexicographical analysis and, more particularly, to automatically generating a hierarchy of terms.

BACKGROUND

A corpus of data may hold a large amount of information, yet finding relevant information may be difficult. A hierarchy of terms may be created to facilitate the search for relevant information. In certain situations, however, known techniques for generating a hierarchy of terms are not effective in certain situations.

BRIEF DESCRIPTION OF THE FIGURES

FIG. 3 illustrates an example of an affinity matrix that records basic affinities;

FIG. 4 illustrates an example of an affinity matrix that records directional affinities;

DETAILED DESCRIPTION

Overview

Figure 1:
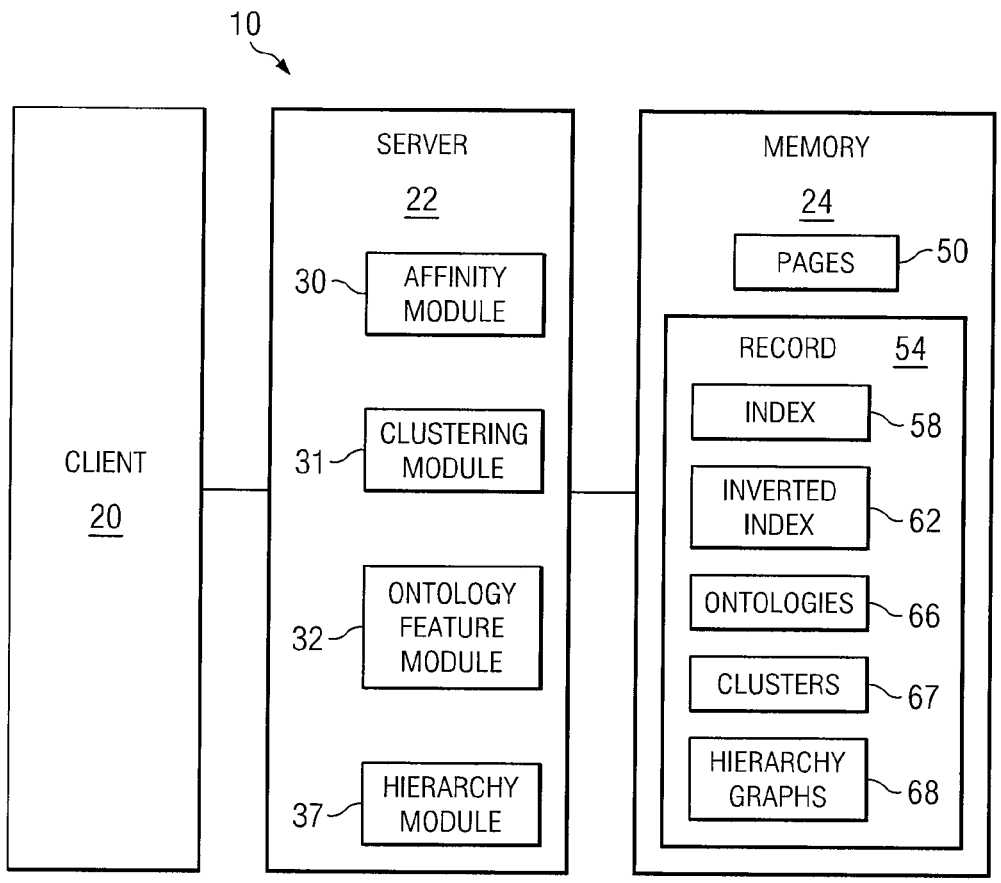
FIG. 1 illustrates one embodiment of a system that automatically generates hierarchical graphs that represent hierarchies of terms.

In certain embodiments, generating a hierarchy of terms includes accessing a corpus comprising terms. The following is performed for one or more terms to yield parent-child relationships: one or more parent terms of a term are identified according to directional affinity; and one or more parent-child relationships are established from the parent terms and each term. A hierarchical graph is automatically generated from the parent-child relationships.

Example Embodiments

In particular embodiments, creating and querying a domain ontology may include the following:

1. Collect documents in a domain. In particular embodiments, a document is a collection of terms. A document may comprise readable text, for example, a book of the New Testament. A document need not comprise text in narrative form, for example, a document may comprise a set of user-entered tags that individually and collectively describe the content of an image. A collection of documents may be referred to as a "domain corpus."

2. Identify the terms of interest ("dictionary terms") in the domain. Examples of terms include a word (such as "tree"), a phrase (such as "graph algorithm"), a named entity (such as "New York"), etc. A term (or concept) may have different forms. In certain cases, different words are used for the same concept, for example, "kidney stones" and "kidney calculi" refer to the same concept, "kidney stones." In other cases, a word stem may have many inflected variants, for example, the word stem "tree" has inflected variants "tree" and "trees." In particular embodiments, forms of the same term may be treated as mapped to the same term. Any suitable form of a dictionary term may appear in a document, but the particular dictionary term need not appear in any document.

Examples of methods for identifying dictionary terms include using a human-generated dictionary for a specific domain, for example, a medical dictionary. In particular embodiments, a list of dictionary terms may be automatically generated from a set of strings of text in a corpus. The strings may be indexed and sorted by frequency, and strings with frequency above a threshold may be selected. Other suitable statistical method may be used to determine terms. In particular embodiments, "word" may be interchangeable with "term" and "dictionary term."

3. Calculate the number of co-occurrences of dictionary terms in a given co-occurrence context. Two terms co-occur if they each appear at least once within the same co-occurrence context. Examples of co-occurrence contexts include a document and a paragraph.

4. Create a directed weighted graph that comprises the domain ontology. The directed weighted graph includes dictionary terms as the nodes and affinities as the weights of the edges. "Directed weighted graph" may be used as the actual representation of the same information that can be represented by any suitable data structure, e.g., a matrix, a Binary Decision Diagram, or a collection of Binary Decision Diagrams.

5. Apply a procedure to query the directed weighted graph. Given one or more dictionary terms as input, the procedure outputs one or more dictionary terms related to the input dictionary terms. For example, the procedure may outputs a sorted list of one or more terms that have the highest differential directional affinity (described below) towards one or more input terms. In this case, the output includes terms that are more closely related to the input terms, in relation to the domain that the ontology addresses.

Any suitable definitions of affinity may be used. In particular embodiments, the following may be used:

1. Basic Affinity a. The basic affinity (A) between terms A and B may be defined as the ratio of the number of co-occurrence contexts that include both terms A and B over the number of co-occurrence contexts that include either of the terms A or B:

$$A(A,B)=|AB|/|A \text{ or } B|$$

b. The basic affinity (A) between terms A and B may also be defined as the ratio of the number of co-occurrence contexts that include both terms A and B over the maximum of either the number of co-occurrence contexts that include A or the number of co-occurrence contexts that include B:

$$A(A,B)=|AB|/\max(|A|,|B|)$$

2. Directional Affinity

The directional affinity (DAff) between terms A and B may be defined as the conditional probability of observing B, given that A was observed in a co-occurrence context:

$$DAff(A, B) = |AB|/|A|$$

That is, directional affinity may be the number of co-occurrence contexts that include both terms A and B, over the number of co-occurrence contexts that include term A. Generally, DAff(A,B) differs from DAff(B,A).

3. Differential Directional Affinity

The differential directional affinity (DiffDAff) between terms A and B may be defined as the directional affinity between terms A and B minus a factor that accounts for the common-ness of the term B in the corpus. The common-ness of the term B in the corpus may be a statistical value over the basic affinity or directional affinity values of the term B towards the other terms in the corpus. In particular embodiment, the common-ness of the term B in a corpus may be the average affinity (AA) of term B, which yields the following definition of differential directional affinity:

$$DiffDAff(A,B) = DA(A,B) - AA(B)$$

The average affinity (AA), or average directional affinity, of a term B may be defined as:

$$AA(B) = AVERAGE\_x DAff(x, B)$$

That is, average affinity may be the average of the directional affinities of a term B over the other terms in the co-occurrence contexts.

FIG. 1 illustrates one embodiment of a system 10 that automatically generates hierarchical graphs that represent hierarchies of terms. In particular embodiments, system 10 accesses a corpus that includes documents (or pages). System 10 identifies parent terms for terms of the corpus according to directional affinity and establishes parent-child relationships among the terms. System 10 then automatically generates a hierarchical graph from the parent-child relationships.

In certain embodiments, directional affinity may be calculated on a specific inverted index II for a given subset of words and a dictionary D, where index II includes, for example, entries $I(w_i)$ and $I(w_j)$ for words $w_i$ and $w_j$. In general, an inverted index is an index data structure that stores mappings from a term to its locations, that is, the co-occurrence contexts in which a term appears. For each pair of words $w_i$ and $w_j$ in D, DA(i,j) may be defined as the values in the conjunction of entries $I(w_i), I(w_j)$ in II divided by the number of values in $I(w_i)$. In general, DA(i,j) is not necessarily equal to DA(j,i). The results may be stored in any suitable manner, for example, row-wise, where the D(1,i) are stored, then the D(2,j) are stored, and so on. For each row i, $|I(w_i)|$ may be stored, followed by the cardinalities of the conjunctions with the $w_j$.

In certain embodiments, directional affinity may be calculated in three phases. In the embodiments, each dictionary term is assigned a unique integer identifier. The entries of an inverted index correspond to the integer identifiers. In Phase 0, the II entries corresponding to D are read. For parameters (s, o), only the element identifiers that are of the form ks+o are kept. The value ks+o defines a subset of the II entries to be examined. In this manner, directional affinities can be computed in parallel. As an example, the result from parameters s,o (1,0) is equivalent to the one obtained from the merging of the computations with parameters (3,0), (3,1), (3,2). This step allows calculation of DA tables for very large inverted indices.

In Phase 1, the conjunctions are calculated row-wise only for DA(i,j). In Phase 2, the calculated upper-triangular UT DA array is read. From that, the lower-triangular part is obtained as the transpose of UT. In certain embodiments, multiple DA arrays of the same dimension may be merged into a single array. A DA array on a large II can be calculated as the $sum_{i=0 \ldots (s-1)}$ DA with parameters (s, i). Additional information may be stored with the calculated conjunctions so that directional affinities can be computed. In certain cases, the cardinalities of the II entries may be stored.

In certain embodiments, the DA may be stored row-wise, so the calculation of the AA entries may proceed in parallel with the calculation of the DA entries. In particular, AA may be generated by summing up the rows of the DA as they are read from the disk and, at the end, normalized by the number of the dictionary entries.

In the illustrated embodiment, system 10 includes a client 20, a server 22, and a memory 24. Client 20 allows a user to communicate with server 22 to generate ontologies of a language. Client 20 may send user input to server 22, and may provide (for example, display or print) server output to user. Server system 24 manages applications for generating ontologies of a language. Memory 24 stores data used by server system 24.

In the illustrated embodiment, memory 24 stores pages 50 and a record 54. A page 50 (or document or co-occurrence context) may refer to a collection of words. Examples of a page 50 include one or more pages of a document, one or more documents, one or more books, one or more web pages, correspondence (for example, email or instant messages), and/or other collections of words. A page 50 may be identified by a page identifier. A page 50 may be electronically stored in one or more tangible computer-readable media. A page 50 may be associated with any suitable content, for example, text (such as characters, words, and/or numbers), images (such as graphics, photographs, or videos), audio (such as recordings or computer-generated sounds), and/or software programs. In certain embodiments, a set of pages 50 may belong to a corpus. A corpus may be associated with a particular subject matter, community, organization, or other entity.

Record 54 describes pages 50. In the embodiment, record 54 includes an index 58, an inverted index 62, ontologies 66, and clusters 67. Index 58 includes index lists, where an index list for a page 50 indicates the words of the page 50. Inverted index 62 includes inverted index lists, where an inverted index list for a word (or set of words) indicates the pages 50 that include the word (or set of words). In one example, list $W_i$ includes page identifiers of pages 50 that include word $w_i$. List $W_i \& W_j$ includes page identifiers of conjunction pages 50 that include both words $w_i$ and $w_j$. List $W_i + W_j$ includes page identifiers of disjunction pages 50 that include either word $w_i$ or $w_j$. $P(W_i)$ is the number of pages 50 of $W_i$, that is, the number of pages 50 that include word $w_i$.

In one embodiment, a list (such as an index list or an inverted index list) may be stored as a binary decision diagram (BDD). In one example, a binary decision diagram $BDD(W_i)$ for set $W_i$ represents the pages 50 that have word $w_i$. The satisfying assignment count $Satisf(BDD(W_i))$ of a $BDD(W_i)$ yields the number $P(W_i)$ of pages 50 that have word $w_i$:

$$P(W_i) = Satisf(BDD(W_i))$$

Accordingly, $$P(W_i \& W_j) = Satisf(BDD(W_i) \text{ AND } BDD(W_j))$$

$$P(W_i + W_j) = Satisf(BDD(W_i) \text{ OR } BDD(W_j))$$

Ontologies 66 represent the words of a language and the relationships among the words. In one embodiment, an ontology 66 represents the affinities between words. In the illustrated example, ontologies 66 include an affinity matrix and an affinity graph. Examples of affinity matrices are described with the reference to FIGS. 3 through 5. An example of an affinity graph is described with reference to FIG. 6. Clusters 67 record clusters of words that are related to each other. Clusters are described in more detail with reference to FIG. 7.

In the illustrated embodiment, server 22 includes an affinity module 30, a clustering module 31, an ontology feature module 32, and a hierarchy module 37. Affinity module 30 may calculate affinities for word pairs, record the affinities in an affinity matrix, and/or report the affinity matrix. Affinity module 30 may also generate an affinity graph. Affinity module 30 is described in more detail with reference to FIG. 2.

In particular embodiments, clustering module 31 may discover patterns in data sets by identifying clusters of related elements in the data sets. In particular embodiments, clustering module 31 may identify clusters of a set of words (for example, a language or a set of pages 50). In general, words of a cluster are highly related to each other, but not to words outside of the cluster. A cluster of words may designate a theme (or topic) of the set of words. In particular embodiments, clustering module 31 identifies clusters of related words according to the affinities among the words. In the embodiments, words of a cluster are highly affine to each other, but not to words outside of the cluster. Clustering module 31 is described in more detail with reference to FIG. 7.

In particular embodiments, ontology feature module 32 may determine one or more ontology features of a set of one or more words (for example, a particular word or document that include words), and may then apply the ontology features in any of a variety of situations. An ontology feature is a feature of a word set that may place the word set in ontology space of a language. Examples of ontology features include depth and specificity. In particular embodiments, depth may indicate the textual sophistication of a word set. A deeper word set may be more technical and specialized, while a shallower word set may be more common. In particular embodiments, the specificity of a word set is related to the number of themes of the word set. A more specific word set may have fewer themes, while a less specific word set may have more themes.

Ontology feature module 32 may apply the ontology features in any suitable situation. Examples of suitable situations include searching, sorting, or selecting documents according to an ontology feature; reporting the ontology features of a document; and determining the ontology features of documents of one or more users. Ontology feature module 32 is described in more detail with reference to FIG. 8.

In particular embodiments, hierarchy module 37 automatically generates hierarchical graphs that represent hierarchies of terms. In the embodiments, hierarchy module 37 accesses a corpus that includes documents (or pages). Hierarchy module 37 identifies parent terms for terms of the corpus according to directional affinity and establishes parent-child relationships among the terms. Hierarchy module 37 then automatically generates a hierarchical graph from the parent-child relationships. Hierarchy module 37 is described in more detail with reference to FIG. 9.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of generators 42 and 46 may be performed by one component, or the operations of affinity calculator 34 may be performed by more than one component. Additionally, operations of system 10 may be performed using any suitable logic comprising software, hardware, and/or other logic. As used in this document, "each" refers to each member of a set or each member of a subset of a set.

Modifications, additions, or omissions may be made to the examples of the matrices without departing from the scope of the invention. A matrix may include more, fewer, or other values. Additionally, the values of the matrix may be arranged in any suitable order.

Figure 2:
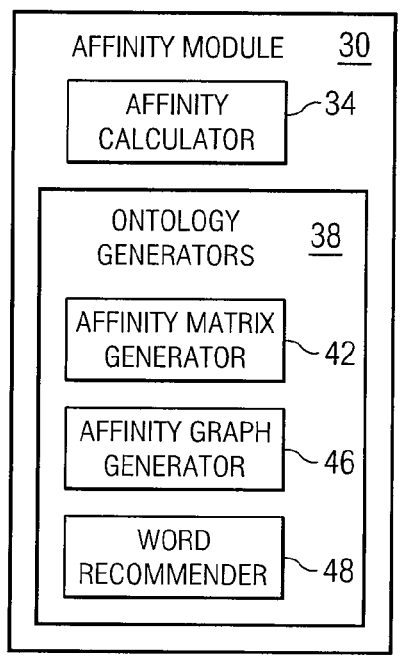
FIG. 2 illustrates one embodiment of an affinity module that may be used with the system of FIG. 1.

FIG. 2 illustrates one embodiment of affinity module 30 that may be used with system 10 of FIG. 1. Affinity module 30 may calculate an affinity for a word pair, record the affinity in an affinity matrix, and/or report the affinity matrix. Affinity module 30 may also generate an affinity graph.

In the illustrated embodiment, affinity module 30 includes an affinity calculator 34, ontology generators 38, and a word recommender 48. Affinity calculator 34 calculates any suitable type of affinity for a word $w_i$ or for a word pair comprising a first word $w_i$ and a second word $w_j$. Examples of affinities include a basic, directional, average, differential, and/or other affinity.

In one embodiment, word recommender 48 receives a seed word and identifies words that have an affinity with the seed word that is greater than a threshold affinity. The threshold affinity may have any suitable value, such as greater than or equal to 0.25, 0.5, 0.75, or 0.95. The threshold affinity may be pre-programmed or user-designated.

A basic affinity may be calculated from the amount (for example, the number) of pages 50 that include words $w_i$ and/or $w_j$. The conjunction page amount represents the amount of pages 50 that include both word $w_i$ and word $w_j$, and the disjunction page amount represents the amount of pages 50 that include either word $w_i$ or word $w_j$. The basic affinity may be given by the conjunction page amount divided by the disjunction page amount. In one example, a number of conjunction pages indicates the number of pages comprising word $w_i$ and word $w_j$, and a number of disjunction pages indicates the number of pages comprising either word $w_i$ or word $w_j$. The basic affinity may be given by the number of conjunction pages divided by the number of disjunction pages:

$$\text{Affinity}(w_i, w_j) = P(W_i \& W_j)/P(W_i + W_j)$$

FIG. 3 illustrates an example of an affinity matrix 110 that records basic affinities. In the illustrated example, affinity matrix 110 records the pairwise affinities of words $w_1, \ldots w_5$. According to affinity matrix 110, the affinity between words $w_0$ and $w_1$ is 0.003, between words $w_0$ and $w_2$ is 0.005, and so on.

Referring back to FIG. 1, an affinity group includes word pairs that have high affinities towards each another, and may be used to capture the relationship between words $w_1$ and $w_2$ with respect to page content. A high affinity may be designated as an affinity over an affinity group threshold. A threshold may be set at any suitable value, such as greater than or equal to 0.50, 0.60, 0.75, 0.90, or 0.95. A word may belong to more than one affinity group. In one embodiment, an affinity group may be represented as a BDD. The pointer for the BDD may be stored with each word of the group in inverted index 62.

A directional affinity may be used to measure the importance of word $w_i$ with respect to word $w_j$. Affinity calculator 34 calculates the directional affinity of word $w_i$ given word $w_j$ from the amount (for example, the number) of pages 50 that include words $w_i$ and $w_j$. A word $w_j$ page amount represents the amount of pages 50 that include word $w_j$. The directional affinity of word $w_i$ given word $w_j$ may be given by the conjunction page amount divided by word $w_j$ page amount. For example, a number of word $w_j$ pages indicates the number of pages 50 that include word $w_j$. The directional affinity of word $w_i$ given word $w_j$ may be given by the number of conjunction pages 50 divided by number of word $w_j$ pages 50:

$$DAffinity(w_i, w_j) = P(W_i \& W_j)/P(W_i)$$

DAffinity($w_i$, $w_j$) is not the same as DAffinity($w_j$, $w_i$). A high directional affinity DAffinity($w_i$, $w_j$) between words $w_i$ and $w_j$ indicates a higher probability that a page 50 includes word $w_i$ given that the page 50 includes word $w_j$. In one example, pages [1 2 3 4 5 6] include word $w_i$, and pages [4 2] include word $w_j$. The pages that include word $w_j$ also include word $w_i$, so from the viewpoint of word $w_j$, word $w_i$ is of high importance. Only in one-third the pages that include $w_i$ also include word $w_j$, so from the viewpoint of word $w_i$, word $w_j$ is of low importance.

FIG. 4 illustrates an example of an affinity matrix 120 that records the directional affinities for words $w_0, \ldots, w_5$. In the example, words 124 are A words, and words 128 are B words. The rows of matrix 120 record the affinity of a B word given an A word, and the columns of affinity matrix 120 record the affinity of an A word given a B word.

Referring back to FIG. 1, the average affinity of a word $w_i$ calculated with respect to the other words $w_j$. In one embodiment, the average affinity may be the average of the affinities between word $w_i$ and every other word $w_j$. The average affinity of word $w_i$ of N words may be given by:

$$AveAff(w_i) = \frac{1}{N} \sum_{j=1}^{N} P(w_i \mid w_j)$$

Figures 5, 6:
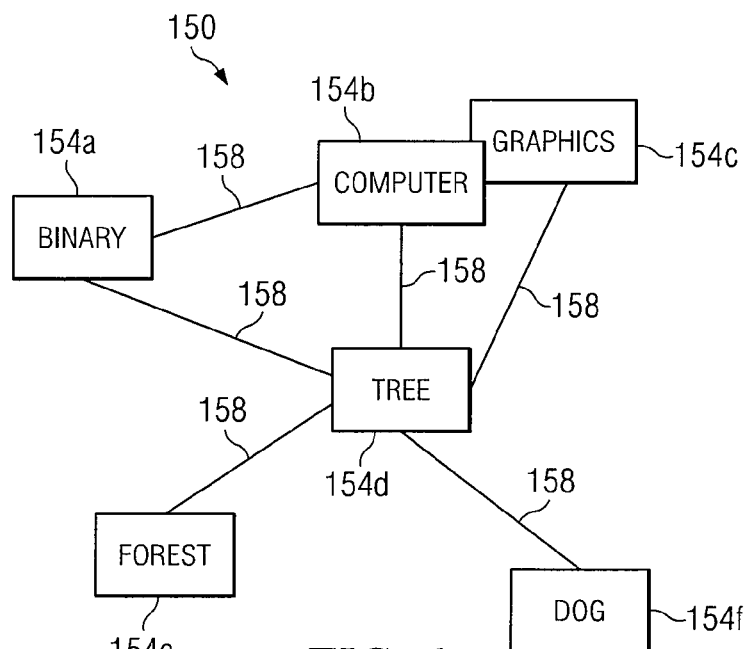
FIG. 5 illustrates an example of an affinity matrix that records average affinities.
FIG. 6 illustrates an example of an affinity graph.

FIG. 5 illustrates an example of an affinity matrix 140 that records average affinities. Rows 142 record basic affinities for word 1 through word 50,000. Row 144 records the average affinities of word 1 through word 50,000.

Referring back to FIG. 1, the average affinity of a word may indicate the depth of the word. A word with a lower average affinity may be regarded as a deeper word, and a word with a higher average affinity may be regarded as a shallower word. Deeper words tend to be more technical, specific, and precise. A page 50 with a higher percentage of deeper words may be regarded as a deeper page, and a page 50 with a lower percentage of deeper words may be regarded as a shallower page. In one embodiment, a user may specify the depth of word and/or pages 50 to be retrieved.

The deeper words of a page 50 may form one or more clusters of highly related words. A cluster may represent a common idea, or theme. The number of themes of a page 50 may indicate the specificity of the page 50. A page 50 with fewer themes may be regarded as more specific, and a page 50 with more themes may be regarded as less specific.

The differential affinity for word $w_i$ with respect to word $w_j$ is the directional affinity between words $w_i$ and $w_j$ minus the average affinity of word $w_j$ for all other words. Differential affinity may be expressed as:

$$DiffAff(w_i, w_j) = DAffinity(w_i, w_j) - AveAff(w_j)$$

Differential affinity removes the bias caused by the general tendency for word $w_j$ to occur in pages 50. In particular circumstances, differential affinity may provide a more accurate indication of the probability that a page includes word $w_i$ given that the page includes word $w_j$.

Differential affinities may be used in a variety of applications. In one example, differential affinities among people's names may be used to study social networking. In another example, differential affinities among language elements may be used to study natural language processing. In another example, differential affinities among products may be used to study marketing.

Affinity calculator 34 may use any suitable technique to search inverted index lists to calculate affinities. For example, to identify pages that include both words $w_i$, and $w_j$, affinity calculator 34 may search list $W_i$ of word $w_i$ and list $W_j$ of word $w_j$ for common elements, that is, common page identifiers.

In particular embodiments, an ontology generator 38 generates an ontology 66 of a language, such as an affinity matrix or an affinity graph. An ontology may be generated from any suitable affinity, such as a basic, directional, average, differential, and/or other affinity. Ontologies 66 may be generated from words selected from a language in any suitable manner. For example, words from a commonly used portion of the language or words related to one or more particular subject matter areas may be selected.

In the illustrated embodiment, ontology generators 38 include an affinity matrix generator 42 and an affinity graph generator 46. Affinity matrix generator 42 generates an affinity matrix that records affinities between words. Affinity graph generator 46 generates an affinity graph that represents affinities between words. In an affinity graph, a node represents a word, and the weight of the directed edge between nodes represents the affinity between the words represented by the nodes. An affinity graph may have any suitable number of dimensions.

FIG. 6 illustrates an example of an affinity graph 150. Affinity graph 150 includes nodes 154 and links 158. A node 154 represents a word. In the example, node 154a represents the word "binary." The weight of the directed edge between nodes between nodes 154 represents the affinity between the words represented by nodes 154. For example, a greater weight represents a greater affinity. A link 158 between the nodes indicates that the affinity between the words represented by the nodes 154 is above an affinity threshold. The affinity threshold may have any suitable value, for example, greater than or equal to 0.25, 0.5, 0.75, or 095.

Figure 7:
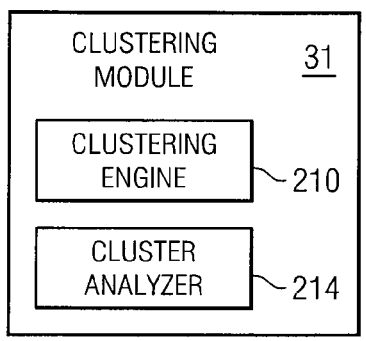
FIG. 7 illustrates one embodiment of a clustering module that may be used with the system of FIG. 1.

FIG. 7 illustrates one embodiment of clustering module 31 that may be used with system 10 of FIG. 1. In particular embodiments, clustering module 31 discovers patterns in data sets by identifying clusters of related elements in the data sets. In particular embodiments, clustering module 31 may identify clusters of a set of words (for example, a language or a set of pages 50). In general, words of a cluster are highly related to each other, but not to words outside of the cluster. A cluster of words may designate a theme (or topic) of the set of words.

In particular embodiments, clustering module 31 identifies clusters of related words according to the affinities among the words. In the embodiments, words of a cluster are highly affine to each other, but not to words outside of the cluster. In one embodiment, words may be regarded as highly affine if they are sufficiently affine. Words may be sufficiently affine if they satisfy one or more affinity criteria (such as thresholds), examples of which are provided below.

Any suitable affinity may be used to identify clusters. In particular embodiments, clustering module 31 uses directional affinity. The directional affinity of a word with respect to other words characterizes the word's co-occurrence. A cluster includes words with similar co-occurrence. In certain embodiments, clustering module 31 uses differential affinity.

Differential affinity tends to removes bias caused by the general tendency of a word to occur in pages 50

In the illustrated embodiment, clustering module 31 includes a clustering engine 210 and a clustering analyzer 214. Clustering engine 210 identifies clusters of word according to affinity, and clustering analyzer 214 applies affinity clustering to analyze a variety of situations.

Clustering engine 210 may identify clusters of words according to affinity in any suitable manner. Three examples of methods for identifying clusters are presented: building a cluster from a set of words, sorting words into clusters, and comparing affinity vectors of words. In one embodiment, clustering engine 210 builds a cluster from a set of words. In one example, clustering engine 210 builds a cluster S from a set W of words $\{w_i\}$ with affinities $*\text{Aff}(w_i, w_j)$. Affinity value $*\text{Aff}(w_i, w_j)$ represents any suitable type of affinity of word $w_i$ with respect to word $w_j$, such as directional affinity DAffinity($w_i$, $w_j$) or differential affinity DiffAff($w_i$, $w_j$). Certain examples of affinity values provided here may be regarded as normalized values. In the example, $\text{Aff}_{for}(w_i, w_j)$ represents forward affinity, and $\text{Aff}_{back}(w_j, w_i)$ represents backward affinity.

In the example, cluster S starts with a seed word $w_q$. The current word $w_x$ represents a word of cluster S that is being compared with a word from set W at the current iteration. Initially, current word $w_x$ is set to seed word $w_q$. During an iteration, current word $w_x$ is set to a word of cluster S. Words $w_i$ of set W are sorted according to their forward affinity $\text{Aff}_{for}(w_i, w_x)$ with current word $w_x$. Starting at the beginning of the sorted set W, candidate words $w_c$ that meet affinity criteria are identified. The affinity criteria may comprise a forward affinity with the current word $w_x$ criterion:

$$\text{Aff}_{for}(w_c, w_x) > Th_{cf}$$

and a backward affinity with the seed word $w_q$ criterion:

$$\text{Aff}_{back}(w_q, w_x) > Th_{cb}$$

where $Th_{cf}$ represents a forward threshold for a candidate word, and $Th_{cb}$ represents a backward threshold for a candidate word. The first words of an ordered set of candidate words $\{w_c\}$ are added to the cluster S, the number of added words given by the parameter $Size_c$. Thresholds $Th_{cf}$ and $Th_{cb}$ may be floating point parameters with any suitable values ranging from a minimum value to a maximum value. In certain examples, suitable values of $Th_{cf}$ and $Th_{cb}$ may be determined from a rank-ordered list of actual affinities. For example, the $200^{th}$ value in the list may be used. Parameter $Size_c$ may be an integer parameter with any suitable value. Examples of suitable values include a default value of 1, 2, 3, or 4. In particular embodiments, the parameters may be varied at certain iterations.

Any suitable number of iterations may be performed. In one example, the number of iterations may be designated prior to initiation of the method. In another example, the number may be calculated during the performance of the method. For example, the number may be calculated from the growth rate of the size of cluster S.

In another embodiment, clustering engine 210, identifies clusters by sorting words of a set of words into clusters. In one example, the words $\{w_i\}$ of set W are sorted according to affinities $*\text{Aff}(w_i, w_j)$, such as differential or directional affinities. In another example, the words $\{w_i\}$ are sorted according to an aggregation function, such as the sum, of affinities of word $w_i$ to each member of a distinct set of words Q. Set W may be selected in any suitable manner. For example, set W may be the X words most relevant to a query, where X may have any suitable value, such as a value in the range from 10 to 100, 100 to 200, or 200 or greater.

In the example, the clusters are initially empty. A first word $w_i$ from set W is placed in a cluster. At each iteration, a current word $w_x$ is selected from set W. Current word $w_x$ is placed into a cluster if $*\text{Aff}(w_x, w_f)$ satisfies an affinity criterion given by an affinity threshold Th, where $w_f$ represents the first word placed in the cluster. Threshold Th may have any suitable value, for example, a value in the range of 0.1 to 0.5 for a minimum value of 0.0 and a maximum value of 1.0. If $*\text{Aff}(w_x, w_f)$ does not satisfy threshold Th, current word $w_x$ is placed into an empty cluster. The iterations are repeated for each word of set W.

After processing the words of set W, small clusters may be eliminated. For example, clusters with less than Y words may be eliminated. Y may have any suitable value, such as a value in a range of 3 to 5, 5 to 10, 10 to 25, 25 to 50, or 50 or greater.

If the number of clusters is not within a satisfactory range, the process may be repeated with a different value of threshold Th that yields a stricter or looser criterion for placement in a cluster. The satisfactory range may be given by a cluster number minimum and a cluster number maximum having any suitable values. Examples of suitable values include values in the range of 1 to 5, 5 to 10, or 10 or greater for the minimum, and values in the range of 10 to 15, 15 to 20, or 20 or greater for the maximum. The value of threshold Th may be increased to increase the number of clusters, and may be decreased to decrease the number of clusters.

In another embodiment, clustering engine 210 identifies clusters by comparing affinity vectors of words. In certain embodiments, the rows and columns of affinity matrix can yield affinity vectors $<w_i, *\text{Aff}(w_i, w_1), \ldots, *\text{Aff}(w_i, w_j), \ldots, *\text{Aff}(w_i, w_n)>$, which represents the affinity of word $w_i$ with respect to words $w_j$, $j=1, \ldots, n$. Affinity value $*\text{Aff}(w_i, w_j)$ represents any suitable type of affinity of word $w_i$ with respect to word $w_j$, for example, directional affinity or differential affinity.

In particular embodiments, affinity vectors with similar affinity values may indicate a cluster. For descriptive purposes only, an affinity vector may be regarded as coordinates of the affinity of a word in affinity space. That is, each affinity value $*\text{Aff}(w_i, w_j)$ may be regarded as a coordinate for a particular dimension. Affinity vectors with similar affinity values indicate that the words with which the vectors are associated are close to each other in affinity space. That is, the vectors indicate that the words have similar affinity relationships with other words and thus may be suitable for membership in the same cluster.

Affinity vectors may be similar if one affinity vector is proximate to the other affinity vector as determined by a suitable distance function. The distance function may be defined over the affinity vectors as, for example, the standard Euclidian distance for vectors of the given size, or as the cosine of vectors of the given size. The distance function may be designated by clustering engine 210 or by a user.

In particular embodiments, clustering engine 210 applies a clustering algorithm to identify affinity vectors with values that are proximate to each other. Examples of clustering algorithms include direct, repeated bisection, agglomerative, biased agglomerative, and/or other suitable algorithms. In one example, clustering engine 210 may include clustering software, such as CLUTO.

Clustering analyzer 214 may use affinity clustering for analysis in any suitable application. In one embodiment, clustering analyzer 214 may use affinity clustering to categorize pages 50. A category may be associated with a cluster identifier or one or more members of a cluster. In one example, clusters of a page 50 may identified, and then the page 50 may be categorized according to the clusters. In another example, important words of a page 50 may be selected, and then clusters that include the words may be located. The page 50 may then be categorized according to the located clusters.

In one embodiment, clustering analyzer 214 may use affinity clustering to analyze corpuses of pages 50. A corpus may be associated with a particular subject matter, community of one or more individuals, organization, or other entity. In one example, clustering analyzer 214 may identify clusters of a corpus and determine a corpus character of the corpus from the clusters. The corpus character may indicate the words relevant to the entity associated with the corpus. If one or more pages 50 have clusters of the corpus character, the pages 50 may be relevant to the entity.

In one embodiment, clustering analyzer 214 may use affinity clustering for search query disambiguation and expansion. In the embodiment, clustering analyzer 214 identifies clusters that include the search terms of a given search query. The clusters provide alternate words and/or categories relevant to the given search query. In one example, words from a cluster may be reported to a searcher to help with the next search query. In another example, clustering analyzer 214 may select words from the clusters and automatically form one or more new search queries. Clustering analyzer 214 may run the new queries in serial or parallel.

In one embodiment, clustering analyzer 214 may use affinity clustering to study a social network. In one example, pages 50 may provide insight into a social network. Examples of such pages include correspondence (such as letters, emails, and instant messages), memos, articles, and meeting minutes. These pages 50 may include words comprising user identifiers (such as names) of people of a social network. Clusters of names may be identified to analyze relationships among the people of the network. In one example, differential affinity clustering may be used to filter out names that appear most pages 50 without providing information, such as names of system administrators.

In particular embodiments, clustering analyzer 214 may analyze data sets by combining and/or comparing the clusters of the data sets. In one embodiment, clusters of overlapping data sets are compared. Clusters from one data set may be mapped to clusters of the other data set, which may provide insight into the relationships between the data sets. For example, the data sets may be from an analysis of documents of a group of colleagues and from a social networking study of the group. A social network cluster may be mapped to a document subject matter cluster to analyze a relationship between the social network and the subject matter.

Figure 8:
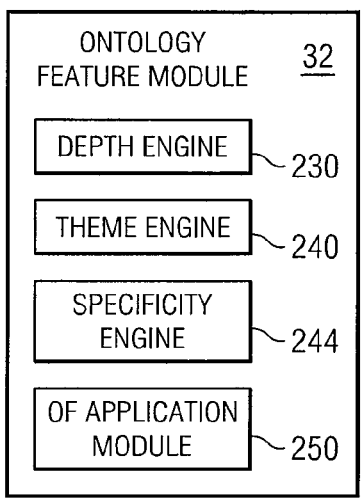
FIG. 8 illustrates one embodiment of an ontology feature module that may be used with the system of FIG. 1.

FIG. 8 illustrates one embodiment of an ontology feature module 32. Ontology feature module 32 may determine one or more ontology features of a set of one or more words (for example, a particular word or document that include words), and may then apply the ontology features in any of a variety of situations. The set of one or more words may include essential terms of a document. A term t may be an essential term if at least one of the top k terms affined to term t is also present in the document. Otherwise, the term may be non-essential to the document.

An ontology feature is a quantifiable measure that characterizes a document along one or more axes of features that may distinguish the document, in a semantic sense, from other documents in a given area. For example, the depth of a document may distinguish the document with respect to its understandability, the specificity of a document may distinguish the document with respect to its focus, and the themes of a document may distinguish the document with respect to its addressed range of topics. An ontology feature can be defined in any suitable manner. For example, independent algorithms in computational linguistics may be used to characterize the readability, or depth, of the document.

In the illustrated embodiment, ontology feature module 32 includes a depth engine 230, a theme engine 240, a specificity engine 244, and an ontology feature (OF) application engine 250. Depth engine 230 may determine the depth of one or more words, for example, a particular word or document that include words. In general, depth may indicate the textual sophistication of words. Deeper words may be more technical and specialized, while shallower words may be more common. In particular embodiments, depth module 32 may calculate the depths of words of a document and then calculate the depth of the document according to the depths of the words. In particular embodiments, depth engine 230 may assign depth values and/or depth rankings to documents and/or words. A deeper document or word may be assigned a higher depth value or ranking, and a shallower document or word may be assigned a lower depth value or ranking.

Depth engine 230 may calculate word depth in any suitable manner. In particular embodiments, depth engine 230 calculates word depth from average affinities. In the embodiments, the depth of a word is a function of the average affinity of the word. A deeper word may have a lower average affinity, while a shallower word may have a higher average affinity. In particular examples, depth engine 230 may calculate the depths of words by ranking the words according to their average affinities. A word with a lower average affinity may be given a higher depth ranking, and a word with a higher average affinity may be given a lower depth ranking.

In particular embodiments, depth engine 230 may calculate word depth using a clustering analysis. In the embodiments, words of a cluster are highly affined to each other, but less so to words outside of the cluster. Distance in cluster space may be measured according to affinity, which may be an indicator of depth. In particular embodiments, words that belong to fewer clusters or to clusters that are smaller and/or farther away from other clusters may be regarded as deeper, and words that belong to more clusters or to clusters that are larger and/or closer to other clusters may be regarded as shallower.

In other particular embodiments, depth engine 230 may calculate word depth by applying a link analysis to an affinity graph 150. The link analysis may be performed by any suitable link analysis algorithm, for example, PAGERANK. For descriptive purposes only, affinity graph 150 of FIG. 6 may be used to calculate word depth. Affinity graph 150 includes nodes 154 and links 158. A node 154 represents a word. A link 158 between nodes 154 indicates that the affinity between the words represented by nodes 154 is above an affinity threshold, that is, the words are satisfactorily affined.

In particular embodiments, depth engine 230 calculates the popularity of nodes 154. A more popular node 154 may represent a shallower word, while a less popular node 154 may represent a deeper word. A link 136 from a first node 154 to a second node 154 is regarded as a popularity vote for the second node 154 by the first node 154. In addition, a vote from a more popular node 154 may have greater weight than a vote from a less popular node 154. Moreover, the affinity of a first node 154 to a second node 154 weights the vote. Depth engine 230 calculates the popularity of nodes 154 from the weighted votes for nodes 154. A less popular word may be regarded as deeper, and a more popular word with may be regarded as shallower.

Depth engine 230 may calculate document depth in any suitable manner. In particular embodiments, depth engine 230 calculates the depth of a document according to the depths of at least one, some, or all words of the document. In certain embodiments, word depth is given by average affinity, so the document depth may be calculated from average affinity of the words of the document. For example, the shallowness of a document may be the average of the average affinity of the words of the document, that is, the sum of the average affinity of each word in document divided by the total number of words in the document. The depth of the document may then be calculated as the inverse of the shallowness of the document.

In particular embodiments, depth may be calculated from the average depth of a selected set of words of the document.

The selected set may include the essential words of the document, such as the top (deepest) X % words, where X may be less than 10, 10 to 20, 20 to 30, 30 to 40, 40 to 50, 50 to 60, 60 to 70, or greater than 10. The selected set may exclude P % of the standard grammar words and/or Q % of the stop words, where P and Q have any suitable values, such as less than 10, 10 to 20, 20 to 30, 30 to 40, 40 to 50, 50 to 60, 60 to 70, or greater than 10

In particular embodiments, depth engine 230 calculates the depth of a document according to the distribution of word depth in the document. In particular embodiments, a deeper document may have a higher percentage of deeper words.

In particular embodiments, depth engine 230 calculates the depth of a document according to document affinity. The affinity between documents describe the relationship between the documents. In certain embodiments, the average document affinity may indicate document depth in a manner similar to how the average word affinity may indicate word depth. Document affinity may be defined in any suitable manner. In one example, the number of common words $P(D_1 \& D_2)$ indicates the number of words in both documents $D_1$ and $D_2$, and the number of distinct words $P(D_1+D_2)$ indicates the number of words in either document $D_1$ or $D_2$. Document affinity DocAff between documents $D_1$ and $D_2$ may be defined as:

$$DocAff(D_1, D_2) = P(D_1 \& D_2)/P(D_1+D_2)$$

Depth engine 230 may calculate an average document affinity that in a manner similar to the calculation of average word affinity. A document with a lower average affinity may be regarded as deeper, and a document with a higher average affinity may be regarded as shallower.

In certain embodiments, depth engine 230 may calculate document depth by applying a link analysis to a document affinity graph. A document affinity graph may be similar to affinity graph 150, except that nodes of a document affinity graph represent documents instead of words. Depth engine 230 weights a link from a first node representing a first document to a second node representing a second document with the document affinity of the second document given the first document. The weights of the outgoing links may then be normalized.

In certain embodiments, a depth graph may be displayed on a user interface to show the depths of documents. A depth slider that can be used to select a depth level may also be displayed. In certain embodiments, if a document comprises sections of a larger document, the depth graph can indicate the depths of the sections.

In certain embodiments, depth engine 230 may calculate document depth in any other suitable manner, such as processing histograms of affinities of a document and/or truncating percentages of distinct words based upon depth and then processing the histograms. Other methods include the Gunning-Fog, Flesch, or Fry methods.

In certain embodiments, depth engine 230 may calibrate depth by mapping depth values to particular depth levels. In certain embodiments, depth values in range $R_i$ may be mapped to level $L_i$. For example, $R_0=\{r_0: r_0<c_0\}$ may be mapped to level $L_0$, $R_1=\{r_1: c_0<r_1<c_1\}$ to level $L_1$, ..., and $R_n=\{r_n: c_n<r_n\}$ to level $L_n$. The ranges may include any suitable depth values and need not be of the same size. There may be any suitable number of levels, such as less than five, five to seven, seven or eight, eight to ten, ten to 20, 20 to 50, 50 to 100, or greater than 100.

Theme engine 240 may determine the themes (or topics) of a document. In particular embodiments, theme engine 240 determines the themes from the clusters of words in the document, which may be identified by clustering module 31. As discussed above, a cluster of words may designate a theme (or topic) of the set of words. The theme of a document may provide useful information about the content of the document. For example, a document that includes the cluster {renal, kidney, protein, problem} is probably about protein leaking from the kidney due to weakening renal functions, rather than the protein content of kidney beans.

In particular embodiments, theme engine 240 determines themes from a theme map. In the embodiments, keywords are extracted from the document using any suitable technique, for example, a term frequency-inverse document frequency (TF-IDF) technique. The keywords are used to select candidate themes from the theme map. The candidate themes are compared to the document to determine how well the themes match the document. In certain examples, a histogram of the candidate themes may be compared to a histogram of the document. If the candidate themes match the document, the themes can provide an estimate of the types and number of themes of the document.

Specificity engine 240 may calculate the specificity of a document. In particular embodiments, specificity engine 240 may assign specificity values and/or specificity rankings to documents. A more specific document may be assigned a higher specificity value or ranking, and a less specific document may be assigned a lower specificity value or ranking.

In particular embodiments, specificity engine 240 calculates the specificity from the number of themes of the document. In certain examples, a more specific document may have fewer themes, and a less specific document may have more themes. In particular embodiments, specificity engine 240 calculates the specificity from the number of themes of the document and the affinity between the themes. In certain examples, a more specific document may have fewer themes with higher affinity between the themes, and a less specific document may have more themes with lower affinity between the themes.

In particular embodiments, the number of themes may be dependent on depth (or level). For example, a single theme at a shallower depth might represent multiple themes at a greater depth. In certain embodiments, the depth may be selected by a user using a depth slider or may be predetermined. In certain embodiments, the level may be selected by a user or may be predetermined. For example, any suitable number of levels may be defined, and the depth may be calculated with respect to the level. For example, the levels may be domain based (for example, engineering, medical, news, sports, or finance domain); specialty based (for example, cardiology, ophthalmology, or nephrology specialty); topic based (for example, hypertension, cholesterol, bypass surgery, or artery-blocks topic); details based (for example, postural hypotension, chronic hypertension, or acute hypertension detail); resolution based (for example, geriatric etiology, medicinal, or genetic resolution); person based (for example, the user query level).

Ontology feature application engine 250 may apply ontology features (such as depth, themes, or specificity) to perform an ontology feature analysis in any suitable situation. Examples of suitable situations include: searching, sorting, recommending, or selecting documents according to an ontology feature; reporting the ontology features of a document; and determining the ontology features of documents (or sets of documents) of one or more users. In particular embodiments, ontology feature application engine 250 may use indices that include information about an ontology feature. In one example, ontology feature application engine 250 uses a document depth (DD) inverted index 62 that is generated and/or maintained according to depth ranking. DD inverted index 62 includes DD inverted index lists, where a DD inverted index list for a word lists document identifiers of documents (or pages 50) that include the word. The document identifier of a document may indicate the depth of the document. For example, the binary encoding used to encode the document identifiers may indicate the depth. In some cases, the DD inverted index lists may list only documents of a satisfactory depth. In another example, ontology feature application engine 250 uses a ranking table and a depth table in addition to inverted index 62. The depth table may indicate the depths of the documents.

In particular embodiments, ontology feature application engine 250 searches for documents with specified values of an ontology feature, such as specified values of document depth or specificity. The specified values may be predetermined, calculated, or selected by a user. In particular embodiments, the values may be selected using a depth slider and/or a specificity slider.

In particular embodiments, ontology feature application engine 250 may use an ontology feature as a sort criterion to sort documents. For example, ontology feature application engine 250 may sort documents according to document depth and/or specificity with respect to themes as well as other sort criteria. In certain examples, ontology feature application engine 250 searches DD inverted index 62 to obtain documents sorted according to document depth. In some examples, ontology feature application engine 250 searches for documents using a non-DD inverted index 62 and then sorts the documents according to depth.

In particular embodiments, ontology feature application engine 250 may graphically display the values of an ontology feature to a client 20. The graphical displays may be provided for some or all documents, for example, for the documents from the top X % of search results. The ontology feature values may be presented in any suitable manner. In some examples, a graphical indicator, such as a number, word, or icon, may indicate a value. The graphical indicator may be placed next to, for example, an item in a list of search results, a headline of an online newspaper, or a document icon. In some examples, modification of existing iconography may indicate the value. For example the size, font, style, color, of text or a graphical indicator may indicate a value. In another example, a graph may indicate the values. An ontology feature histogram may include a document amount axis and a ontology feature axis, and may indicate the amount of documents of particular ontology feature values. For example, a document depth histogram that includes a document amount axis and a document depth axis may indicate the amount of documents of particular document depths.

In particular embodiments, ontology feature application engine 250 may allow a user to request a search for documents that have particular ontology feature values. The user may be allowed to specify values for different words of a query. In certain examples, ontology feature application engine 250 may provide a user with the option to select a depth, and the user may then input the selected depth. The options may be presented in any suitable manner, such as in: (i) absolute terms (for example, a number or a range of numbers representing depth); (ii) relative terms (for example, a portion of search results with respect to depth, such as "deepest X %"); (iii) semantic terms (for example, 'introductory', 'shallow', 'deep', 'very deep', and/or 'highly technical'); (iv) graphical terms (for example, a slider, a button, and/or other graphical element); or (v) any suitable combination of terms (for example, a slider with semantic labels). In some cases, a slider may include a shallow end and a deep end. A user may move the slider toward one end or the other to indicate a selected depth. When the search results are provided, a document depth histogram may appear by the slider, and may use the slider as the document depth axis.

In particular embodiments, ontology feature application engine 250 may calculate an ontology feature character of a set of one or more users. Ontology feature characters may include user depth and user specificity in the context of a theme. The ontology feature character describes the ontology features of documents associated with the user set. For example, a scientist may use deeper documents than a third grader would use. The ontology feature character may be given with respect to one or more themes. For example, a geneticist may use deeper documents in the field of genetics than he would use in the field of poetry. The ontology feature character may be used to determine the expertise of a user, automatically build a resume for a user, and analyze the social network of a user.

Any suitable documents associated with a user may be analyzed to estimate the ontology feature character, for example, correspondence (such as email and instant messages), web pages, and search history (such as search queries and selected pages). In particular embodiments, ontology feature application engine 250 may track an ontology feature character over time, and may use the past character to predict a future character. In certain examples, ontology feature application engine 250 may assume that a user depth and/or specificity generally increases with time and/or activity in an area.

In particular embodiments, ontology feature application engine 250 may combine certain operations. For example, ontology feature application engine 250 may monitor the depth of a user and then search for documents according to the user depth. In one example, user depth is monitored, and news is provided to the user according to the depth. Future user depth is predicted, and news that fits the predicted user depth is provided.

Figure 9:
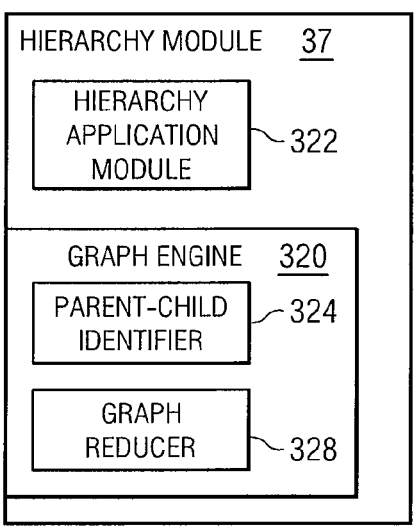
FIG. 9 illustrates one embodiment of a hierarchy module that may be used with the system of FIG. 1.

FIG. 9 illustrates one embodiment of hierarchy module 37 that may be used with system 10 of FIG. 1. In particular embodiments, hierarchy module 37 generates hierarchical graphs that represent hierarchies of terms. In the embodiments, hierarchy module 37 accesses a corpus, such as pages 50 (or documents). Hierarchy module 37 identifies parent terms for terms of the corpus according to directional affinity and establishes parent-child relationships. Hierarchy module 37 then automatically generates a hierarchical graph from the parent-child relationships. In the illustrated embodiment, hierarchy module 37 includes a graph engine 320 and a hierarchy application module 322. Graph engine 320 generates hierarchical graphs 350. An example of a hierarchical graph is described with reference to FIG. 10.

Figure 10:
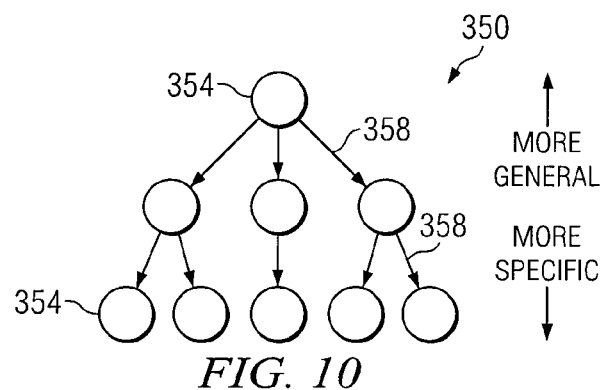
FIG. 10 illustrates an example of a hierarchical graph.

FIG. 10 illustrates an example of a hierarchical graph 350. In particular embodiments, hierarchical graph 350 represents a hierarchy of terms. In the embodiments, hierarchical graph 350 includes nodes 354 that represent terms and arcs 358 that represent a parent-child relationship from a parent term to a child term. In particular embodiments, in a parent-child relationship, a parent term and a child term are related by affinity, such as directional affinity. The parent term may be more general than the child term, and conversely the child term may be more specific than the parent term.

In particular embodiments, a relationship between a grandparent term (or great-grandparent term or so on) and a child term may also be referred to as a parent-child relationship. That is, a parent-child relationship may start from a parent term, pass through zero, one, or more parent/child terms (that operate as parent and child terms in the relationship), and end at a child term. In other words, a parent-child relationship may have any suitable number of generations.

Referring back to FIG. 9, in the illustrated embodiment, graph engine 320 includes a parent-child identifier 324 and a graph reducer 328. In particular embodiments, parent-child identifier 324 identifies parent-child relationships among terms, and graph reducer 328 reduces hierarchical graphs 350.

In particular examples, graph engine 320 generates hierarchical graph 350 for a set S of documents of a corpus C. A document may include one or more terms. Pages(X, C) represents a subset of set S that includes documents that have at least one occurrence of term X. Pages(X+Y, C) represents a subset of set S that includes documents that have at least one occurrence of term X and at least one occurrence of term Y. DocFreq(X, C) represents the number of documents that include at least one occurrence of term X, and may be calculated according to:

$$DocFreq(X, C) = |Pages(X, C)|$$

As discussed above, directional affinity may be used to measure of how important a given term is to another term. In particular embodiments, given that a document has a first term, the directional affinity indicates the likelihood that the document has a second term. If the likelihood is high, then there is a high directional affinity, and if the likelihood is low, then there is a low directional affinity. For example, lymphoma is a type of cancer. Documents that include "lymphoma" probably also include "cancer." Accordingly, there is a high directional affinity from lymphoma to cancer. The reverse, however, is not necessarily the case. There are several kinds of cancer, so many documents that include "cancer" probably do not include "lymphoma." Accordingly, there is a low directional affinity from cancer to lymphoma.

Directional affinity may be expressed in any suitable manner, for example, using the expression presented above. In other embodiments, DAff(X, Y, C) represents the directional affinity of Y given X in corpus C, and may be calculated according to:

$$DAff(X, Y, C) = DocFreq(X+Y, C)/DocFreq(X, C)$$

In particular embodiments, parent-child identifier 324 identifies parent-child relationships by determining a set of candidate parent terms $Y_i$ for a given term X. In the embodiments, there is a high directional affinity from given term X to a parent term $Y_i$, but parent term $Y_i$ appears in more documents without given term X than with term X, indicating that term X is related to, but not indispensable to, parent term $Y_i$.

In particular embodiments, the condition that there is a high directional affinity from given term X to a parent term $Y_i$ may be expressed as:

$$DAff(X, Y_i, S) \geq Th_{high}$$

where $Th_{high}$ represents a higher directional affinity threshold indicating a higher directional affinity. The higher directional affinity threshold may have any suitable value, such as value in the ranges of 0.5 or greater, 0.6 or greater, or 0.7 or greater.

In particular embodiments, the condition that parent term $Y_i$ appears in more documents without given term X than with term X and that term X is related, but not indispensable, to parent term $Y_i$ may be expressed as:

$$DAff(Y_i, X, S) \leq Th_{low}$$

$$DAff(Y_i, X, S) \geq Th_{min}$$

where $Th_{low}$ represents a lower directional affinity threshold indicating a lower directional affinity, and $Th_{min}$ represents a minimum directional affinity threshold. The lower directional affinity threshold may have any suitable value, such as value in the ranges of 0.5 or lower, 0.4 or lower, or 0.1 or lower. The minimum directional affinity threshold may have any suitable value, such as value in the ranges of 0.1 or lower, 0.01 or lower, or 0.001 or lower. A candidate parent term $Y_i$ that satisfies the above conditions for a given term may be regarded as a parent term for the given term, which may be regarded as the child term.

Nodes 354 representing the terms may be organized into hierarchical graph 350 according to the parent-child relationships. In particular embodiments, graph reducer 328 reduces hierarchical graph 350 by removing a redundant parent-child relationship. An example of removal of a redundant parent-child relationship is described with reference to FIGS. 11A and 11B.

Figure 11A:
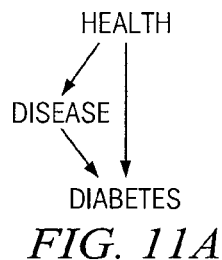
FIGS. 11A and 11B illustrate nodes from which a redundant parent-child relationship may be removed.
Figure 11B:
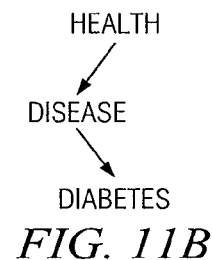

FIGS. 11A and 11B illustrate nodes from which a redundant parent-child relationship may be removed. A redundant parent-child relationship may be a parent-child relationship that is redundant with a given parent-child relationship. The redundant parent-child relationship may provide the same or less information than the given parent-child relationship provides. For example, a given parent-child relationship may have a parent term, zero, one or more parent/child terms, and a child term. The redundant parent-child relationship may have the same parent term, a subset of the same parent/child terms, and the same child term, and no other terms. In other words, the child has two parent terms that are linked to each other.

In the illustrated example, the given parent-child relationship has parent term "health," parent/child term "disease," and child term "diabetes." The redundant parent-child relationship has parent term "health" and child term "diabetes." Graph reducer 328 may remove the redundant parent-child relationship.

Referring back to FIG. 9, in particular embodiments, hierarchy application module 322 applies hierarchical graphs 350. Hierarchy module 37 may generate any suitable hierarchical graph from any suitable corpus, which hierarchy application module 322 may apply in any suitable manner.

In particular embodiments, the corpus comprises documents that include terms, and hierarchical graph 350 serves as a catalog of the documents that may be used to search the documents. In certain examples of the embodiments, hierarchy application module 322 sends parent terms of hierarchical graph 350 to a client. A user may select from the parent terms as search terms. Hierarchy application module 322 receives a selection of a parent term and sends the child terms of the selected parent to the client. A user may select from the terms, and the process may be repeated until the end of hierarchical graph 350 is reached or the user has indicated a final selection.

In other examples of the embodiments, hierarchy application module 322 receives a search query comprising a parent term of the hierarchical graph. Hierarchy application module 322 identifies child terms of the parent term and searches the corpus using the parent term and the child terms. In yet other examples of the embodiments, each graph term of hierarchical graph 350 may be associated with a document that includes the graph term. Hierarchy application module 322 receives a search query comprising a parent term of hierarchical graph 350. Hierarchy application module 322 then retrieves one or more documents associated with the parent term or a child of the parent term.

In particular embodiments, the corpus comprises search results, and hierarchical graph 350 organizes the search results according to the parent-child relationships of the search results. A term of hierarchical graph 350 may represent a topic of a search result or of a cluster in which the search result appears. Hierarchy application module 322 may present hierarchical graph 350 and/or the organized search results to a user.

Modifications, additions, or omissions may be made to the methods without departing from the scope of the invention. The methods may include more, fewer, or other steps. Additionally, steps may be performed in any suitable order.

Certain embodiments of the invention may provide one or more technical advantages. A technical advantage of one embodiment may be that hierarchical graphs that represent hierarchies of terms are automatically generated for a corpus of documents. The hierarchical graphs describe parent-child relationships among the terms and may serve to catalog the documents of the corpus. A technical advantage of another embodiment may be that hierarchical graphs are automatically generated for search results. The hierarchical graphs may serve to organize the search results.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A method comprising:
    accessing a corpus stored in one or more tangible media, the corpus comprising a plurality of terms;
    performing the following for each term of one or more terms of the plurality of terms to yield a plurality of parent-child relationships:
    identifying one or more parent terms of the each term according to directional affinity, the plurality of terms comprising the one or more parent terms,
    the directional affinity being the number of co-occurrence contexts that include two terms, over the number of co-occurrence contexts that include one term; and
    establishing one or more parent-child relationships from the one or more parent terms and the each term; and
    automatically generating a hierarchical graph from the plurality of parent-child relationships,
    wherein the automatically generating the hierarchical graph from the plurality of parent-child relationships comprises reducing the hierarchical graph by:
    identifying a parent-child relationship and a redundant parent-child relationship of the hierarchical graph; and
    removing the redundant parent-child relationship from the hierarchical graph.

2. The method of claim 1, the identifying the one or more parent terms of the each term according to directional affinity further comprising:
    determining that there is a high directional affinity from the each term to a candidate parent term;
    determining that there is a low non-zero directional affinity from the candidate parent term to the each term; and
    identifying the candidate parent term as a parent term of the each term.

3. The method of claim 1, the identifying the one or more parent terms of the each term according to directional affinity further comprising:
    determining that a directional affinity from the each term to a candidate parent term is greater than 0.6 and less than or equal to one;
    determining that a directional affinity from the candidate parent term to the each term is less than 0.4 and greater than 0.1; and
    identifying the candidate parent term as a parent term of the each term.

4. The method of claim 1:
    the corpus comprising a plurality of documents, the plurality of documents comprising the plurality of terms; and
    the hierarchical graph representing a catalog of the plurality of documents.

5. The method of claim 1:
    the corpus comprising a plurality of search results;
    a term of the one or more terms representing a topic of a search result; and
    the hierarchical graph describing the plurality of parent-child relationships of the plurality of search results.

6. The method of claim 1:
    the corpus comprising a plurality of search results organized into a plurality of clusters;
    a term of the one or more terms representing a topic of a cluster; and
    the hierarchical graph describing the plurality of parent-child relationships of the plurality of search results.

7. The method of claim 1, further comprising:
    sending a plurality of parent terms of the hierarchical graph to a client;
    receiving a selection of a parent term, the selected parent term having a plurality of child terms; and
    sending the plurality of child terms to the client.

8. The method of claim 1, further comprising:
    receiving a search query comprising a parent term of the hierarchical graph;
    identifying one or more child terms of the parent term; and
    searching the corpus using the parent term and the one or more child terms.

9. The method of claim 1:
    the corpus comprising a plurality of documents, the plurality of documents comprising the plurality of terms; and
    further comprising:
    associating each graph term of the hierarchical graph with a document that includes the each graph term;
    receiving a search query comprising a parent term; and
    retrieving one or more documents associated with a child of the parent term.

10. One or more non-transitory computer-readable tangible media encoding software operable when executed to:
    access a corpus stored in one or more tangible media, the corpus comprising a plurality of terms;
    perform the following for each term of one or more terms of the plurality of terms to yield a plurality of parent-child relationships:
    identify one or more parent terms of the each term according to directional affinity, the plurality of terms comprising the one or more parent terms,
    the directional affinity being the number of co-occurrence contexts that include two terms, over the number of co-occurrence contexts that include one term; and
    establish one or more parent-child relationships from the one or more parent terms and the each term; and
    automatically generate a hierarchical graph from the plurality of parent-child relationships,
    wherein the automatically generating the hierarchical graph from the plurality of parent-child relationships comprises reducing the hierarchical graph by:
    identifying a parent-child relationship and a redundant parent-child relationship of the hierarchical graph; and
    removing the redundant parent-child relationship from the hierarchical graph.

11. The computer-readable tangible media of claim 10, the software further operable to identify the one or more parent terms of the each term according to directional affinity by:
    determining that there is a high directional affinity from the each term to a candidate parent term;
    determining that there is a low directional affinity from the candidate parent term to the each term;
    determining that a directional affinity from the candidate parent term to the each term is above a minimum threshold; and
    identifying the candidate parent term as a parent term of the each term.

12. The computer-readable tangible media of claim 10, the software further operable to identify the one or more parent terms of the each term according to directional affinity by:
    determining that a directional affinity from the each term to a candidate parent term is greater than 0.6 and less than or equal to one;
    determining that a directional affinity from the candidate parent term to the each term is less than 0.4 and greater than 0.1; and
    identifying the candidate parent term as a parent term of the each term.

13. The computer-readable tangible media of claim 10:
the corpus comprising a plurality of documents, the plurality of documents comprising the plurality of terms; and
the hierarchical graph representing a catalog of the plurality of documents.

14. The computer-readable tangible media of claim 10:
the corpus comprising a plurality of search results;
a term of the one or more terms representing a topic of a search result; and
the hierarchical graph describing the plurality of parent-child relationships of the plurality of search results.

15. The computer-readable tangible media of claim 10:
the corpus comprising a plurality of search results organized into a plurality of clusters;
a term of the one or more terms representing a topic of a cluster; and
the hierarchical graph describing the plurality of parent-child relationships of the plurality of search results.

16. The computer-readable tangible media of claim 10, the software further operable to:
send a plurality of parent terms of the hierarchical graph to a client;
receive a selection of a parent term, the selected parent term having a plurality of child terms; and
send the plurality of child terms to the client.

17. The computer-readable tangible media of claim 10, the software further operable to:
receive a search query comprising a parent term of the hierarchical graph;
identify one or more child terms of the parent term; and
search the corpus using the parent term and the one or more child terms.

18. The computer-readable tangible media of claim 10:
the corpus comprising a plurality of documents, the plurality of documents comprising the plurality of terms; and
the software further operable to:
associate each graph term of the hierarchical graph with a document that includes the each graph term;
receive a search query comprising a parent term; and
retrieve one or more documents associated with a child of the parent term.

\* \* \* \* \*